United States Patent [19]

Shimazoe et al.

[11] 4,065,971
[45] Jan. 3, 1978

[54] SEMICONDUCTOR PRESSURE TRANSDUCER

[75] Inventors: Michitaka Shimazoe; Kousuke Nakamura; Yasuo Matsushita; Satoshi Shimada; Kazuji Yamada, all of Hitachi; Yukio Takahashi, Katsuta, all of Japan

[73] Assignee: Hitachi, Ltd., Japan

[21] Appl. No.: 701,531

[22] Filed: July 1, 1976

[30] Foreign Application Priority Data

July 4, 1975 Japan .................................. 50-81778

[51] Int. Cl.² .............................................. G01L 9/06
[52] U.S. Cl. .................................................... 73/727
[58] Field of Search ................. 73/398 AR, 393, 406, 73/88.5 SD; 338/3, 4, 42

[56] References Cited

U.S. PATENT DOCUMENTS

| 3,456,226 | 7/1969 | Vick | 73/88.5 SD |
| 3,513,430 | 5/1970 | Heller | 73/398 AR |
| 3,537,319 | 11/1970 | Yerman | 73/398 AR |
| 3,772,628 | 11/1973 | Underwood et al. | 73/88.5 SD |

Primary Examiner—James J. Gill
Assistant Examiner—Anthony V. Ciarlante
Attorney, Agent, or Firm—Craig & Antonelli

[57] ABSTRACT

A semiconductor pressure transducer includes a monocrystalline semiconductor diaphragm, the outer edges of which are fixed. When subjected to pressure, the transducer produces radial strains of opposite polarity in a central portion thereof and a portion surrounding the central portion close to the edge of the strain inducing region. The diaphragm contains a plurality of elongated resistances formed of semiconductor material of the same conductivity type which are electrically isolated from the diaphragm, per se. Resistances of an individual set which lie in proximity to one another are combined in the form of a bridge. The longitudinal direction of resistances forming one set of opposing arms of the bridge extend along axes of the same crystal system as the longitudinal direction of the elongated resistances forming the other set of opposing arms of the bridge. However, the longitudinal directions of the separate sets of resistances forming the opposing arms of the bridge lie in directions so that they do not orthogonally intersect each other.

6 Claims, 7 Drawing Figures

SEMICONDUCTOR PRESSURE TRANSDUCER

FIELD OF THE INVENTION

The present invention is directed to a semiconductor pressure transducer, particularly one employing elongated resistances disposed in a monocrystaline semiconductor diaphragm, which resistances are combined together to form a bridge.

BACKGROUND OF THE INVENTION

In recent years various types of silicon pressure transducers which employ a monocrystaline silicon wafer as a diaphragm have been proposed. These transducers contain diffused elongated resistances, which are obtained through present day integrated circuit technology and employ a characteristic of silicon in that its specific resistance changes due to strain, i.e. the piezo-resistive effect. The magnitude of the piezo-resistive effect differs greatly in dependence upon the crystal axis direction. The degree of strain of a silicon diaphragm in response to the application of pressure will differ for respective positions on the diaphragm.

One of the requirements of a silicon pressure transducer is that when the bridge is composed of elongated resistances, the pressure-electric output transduction sensitivity should be high. Moreover, when the pressure is zero, there should be no electric output and, furthermore, the pressure transducer should be minimally susceptible to the influence of changes in ambient temperature.

U.S. Pat. No. 3,537,319 to Yerman, issued Nov. 3, 1970 discloses one type of prior art silicon pressure transducer. In accordance with the pressure transducer described in the patent, when pressure is applied on one side of the silicon diaphragm, a compressive strain is created at the central portion of the diaphragm, whereas a tensile strain is created in the portion of the diaphragm surrounding the central portion and close to the edge of the strain inducing region. As a result, along the radius of the central portion and the surrounding portion close to the edge of the strain inducing region, $p$-type elongated resistances are diffused. These resistances are formed in the $<111>$ direction of the (110) face of an $n$-type silicon diaphragm. The $<111>$ direction is employed since the strain-resistance transduction sensitivity (the gaugefactor) in this direction is the greatest.

In accordance with this transducer, however, the four elongated resistances which are combined into a bridge are separately arranged in two portions of the diaphragm. Two of the resistances are disposed in the central portion of the diaphragm while the remaining two resistances are disposed in the surrounding portion of the diaphragm. As a result, variations in the dimensions and impurity concentrations of the individual resistances are prone to occur during the process of forming the respective resistances, particularly during the photo-etching and impurity diffusion steps. As a result, there will necessarily occur variations of the resistance values and temperature coefficients of the respective elongated resistances. This means that when the bridge is formed of these elongated resistances, it necessarily becomes an unbalanced bridge and will provide an electric output even for zero pressure input; also, the electric output is affected by the ambient temperature.

In an attempt to minimize and prevent the occurrence of such possible variations in the resistances contained within a semiconductor pressure transducer, the present inventors approached the problem in forming four elongated resistances in proximity to one another. An attempt was made to provide $p$-type elongated resistances in proximity to one another, the individual resistances being disposed only within the tensile strain region of the surrounding portion of the $n$-type silicon diaphragm, of the type described in the above-referred to patent. Two elongated resistances which were to form one set of opposing arms of the bridge were arranged in the $<110>$ axial direction of a radial direction of the crystal of the (100) face of the $n$-type silicon diaphragm. The remaining two resistances which were to form the other set of resistances of the opposing arms of the bridge were disposed in the $<110>$ axis direction intersecting in a direction orthogonal to the direction of the first mentioned pair of resistances. Namely, in the (110) face of the $n$-type silicon diaphragm, one pair of opposing arms of the bridge, made up of the respective elongated resistances, were disposed in the $<111>$ axial direction while the other two resistances were formed in the $<112>$ axial direction, intersecting orthogonally to the former direction.

With this arrangement, the inventors determined that the strain-resistance transduction sensitivity was reduced in dependence upon the orientation of the elongated resistances. The impurity diffusion rate differs in accordance with the direction of the silicon crystal axis, so that the dimensions of the elongated resistances in accordance with the different crystal directions were necessarily not the same and exhibited different resistance values. Consequently, when the bridge was assembled with these elongated resistances, the bridge was unbalanced and an electric output was provided even for zero pressure input to the silicon diaphragm.

SUMMARY OF THE INVENTION

One object of the present invention is to provide a semiconductor pressure transducer made up of a plurality of elongated resistances which exhibit equal resistance values and produce no electric output for zero pressure input to the transducer, when the resistances are combined into a bridge.

Another object of the invention is to provide a semiconductor pressure transducer made up of a plurality of elongated resistances, the values of which do not undergo different changes for changes in ambient temperature.

Still a further object of the invention is to provide a semiconductor pressure transducer having a high pressure-electric output transduction sensitivity.

In accordance with the present invention, a monocrystaline semiconductor diaphragm, having a prescribed radius, contains a plurality of elongated resistances of the same conductivity type formed in one surface of the diaphragm and electrically isolated from the diaphragm, per se. The resistances are disposed in a surrounding portion adjacent the edge of the strainable region of the diaphragm, so that the resistances which are to be combined into a bridge are disposed close to one another. A characteristic feature of the present invention is the fact that the longitudinal direction of the respective elongated resistances which constitute one set of opposing arms of a bridge does not orthogonally intersect the longitudinal direction of the elongated resistances constituting the other set of opposing arms of the bridge, which one resistance set and other resistance set extend along the axis of the same crystallographic system among the crystal axes of the semiconductor diaphragm.

DETAILED DESCRIPTION OF THE INVENTION

Figure 1:
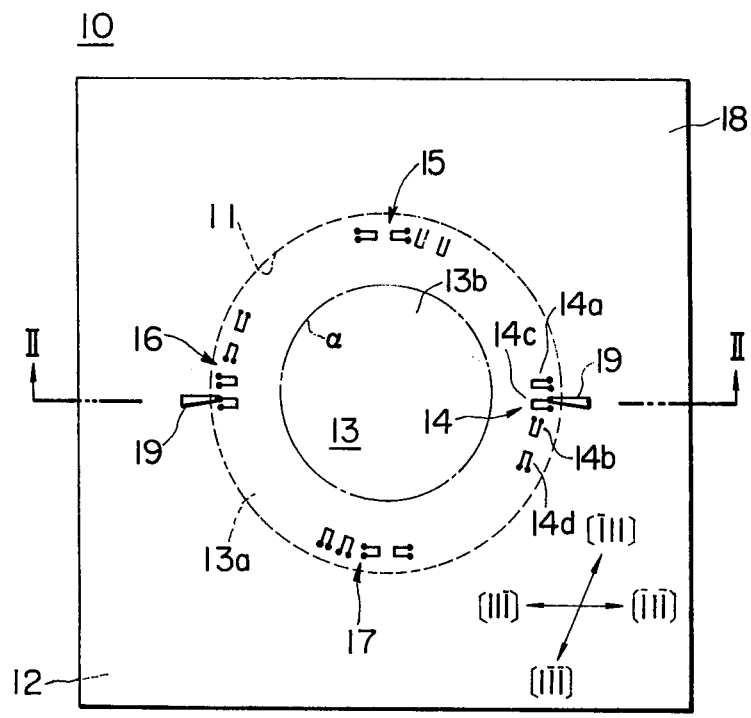
FIG. 1 is a plan view of a silicon diaphragm according to one embodiment of the pressure transducer of the present invention.
Figure 2:
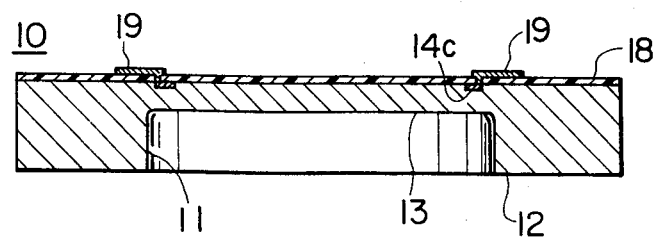
FIG. 2 is a vertical sectional view of the silicon diaphragm taken along line II — II of FIG. 1.

In the embodiment of the invention shown in FIGS. 1 and 2, a square monocrystaline silicon wafer 10, 14mm on an edge and 2mm in thickness has its upper surface formed in the (110) crystal plane. In the central area of the silicon diaphragm 10, there is a concave portion 11 which has a diameter of about 8 mm and a depth of about 1.85mm, so as to leave a thin-walled portion 13 which strains when subjected to a pressure input.

The entire perimeter of the diaphragm of the pressure transducer 10, namely at the fixed-walled portion 12 surrounding the concave portion 11, is affixed in an airtight manner to the flange portion of a structural body, not shown, in which the pressure transducer diaphragm is mounted. As a result, a fluid pressure input can act at least upon one of the upper and lower surfaces of the diaphragm 10.

The thin-walled portion 14 may be considered as comprised of a central portion 13b and a surrounding annular portion 13a, as illustrated in FIG. 1, the edge of the strainable region being designated by the one-dot chain line α.

Figure 3:
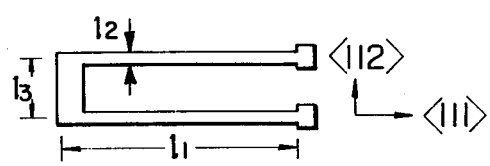
FIG. 3 is an enlarged view of the planar configuration of an individual elongated resistance disposed in the silicon diaphragm shown in FIGS. 1 and 2.

Within the portion 13a are four sets of elongated resistances 14 through 17, formed by diffusing a p-type impurity into the surface of the n-type silicon body 10. Each of the elongated resistance sets 14 through 17 is made up of four U-shaped elongated resistances, an enlarged view of each of which is shown in FIG. 3.

Each U-shaped resistance has a length $l_1$ of 600 microns, a width $l_2$ of 30 microns, a bridging portion length $l_3$ of 90 microns, a surface impurity concentration of $2 \times 10^{18}$ atoms/cc, and a diffusion depth of 5 microns.

On the upper surface of the diaphragm 10 a silicon oxide film 18 is provided. Aluminum vapor is coated to form electrical connections 19, which are secured to an end portion of each elongated resistance through an opening provided in the silicon oxide film 18. For purposes of simplifying the drawings, the aluminum vapor coating film 19 is illustrated only for the end portions of a single elongated resistance of each of the resistance sets 14 and 16. Since the elongated resistances of the respective sets 14 through 17 are formed in the same manner, the following description will relate to the characteristics of an individual set, corresponding to set 14 shown in the right hand portion of FIG. 1, made up of individual resistances 14a – 14d.

Figure 4:
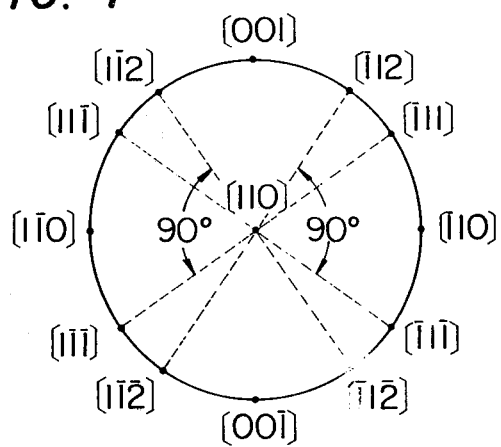
FIG. 4 illustrates the crystallographic axial directions of the silicon diaphragm where the upper surface of the silicon diaphragm is the (110) face.

FIG. 4 illustrates crystal axis directions wherein the upper surface of a silicon diaphragm 10 is in the crystal plane (110). The manner in which the respective elongated resistances of resistance set 14 are formed will be described with reference to FIG. 4.

Among the four elongated resistances of the set 14, resistances 14a and 14c have their longitudinal direction parallel to the [$\bar{1}11$] axial direction in a radial direction. The other two elongated resistances 14b and 14d have their longitudinal direction along the [1$\bar{1}$1] axis direction inclined at an angle of about 71° relative to the axial direction of resistances 14a and 14c. (The [1$\bar{1}$1] direction forms a right angle [$\bar{1}$12] axial direction).

Figure 5:
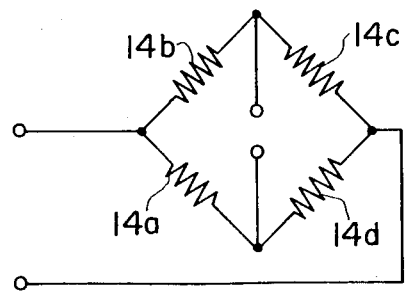
FIG. 5 illustrates a bridge wherein the elongated resistances of the silicon diaphragm shown in FIGS. 1 and 2 form the opposing arms of the bridge.

The elongated resistances 14a – 14d are assembled into a bridge configuration as illustrated in FIG. 5. Resistances 14a and 14c form one set of opposing arms of the bridge while the other resistances 14b and 14d form the other opposing arms of the other set of resistances forming the bridge. Namely, from a resistance bridge standpoint, elongated resistances 14a – 14d are formed in the silicon diaphragm so that the longitudinal direction of the resistances of one set which form opposing arms of the bridge do not intersect orthogonally with the longitudinal direction of the other resistances which form the other set of the opposing arms making up the bridge, while, at the same time, extending along crystal axis of the same system; in the example given here, that system is the <111> system.

For each of the elongated resistances 14a – 14d which is assembled into the bridge as shown in FIG. 5, current flows along the U-shaped resistance, shown in enlarged form in FIG. 3, referred to above. As a result, when the silicon diaphragm 10 is depressed in response to the application of fluid pressure, the elongated resistances 14a and 14c undergo longitudinal tensile strain while resistances 14b and 14d undergo lateral tensile strain. This results in an imbalance in the bridge, due to the change in resistance values, and the pressure applied to the diaphragm can be detected as an electric signal across the terminals of the bridge.

As was described above, one of the significant features of the present invention is the zero output provided by the bridge in the absence of a pressure input and the accurate detection of the pressure even for changes in temperature. It is due to the crystal system orientation of the individual resistances of the bridge which results in the improved pressure transducer.

More particularly, as illustrated in FIG. 4, a monocrystaline silicon wafer which has its surface in the (110) plane, includes the [$\bar{1}$11] the [$\bar{1}$1$\bar{1}$], the [11$\bar{1}$] and the [1$\bar{1}$1] axial directions. When resistances 14a and 14c are arranged in the [$\bar{1}$1$\bar{1}$] axial direction and the other elongated resistances 14b and 14d are arranged in the [111] axial direction inclined with respect to the [$\bar{1}$1$\bar{1}$] axial by about 71°, the direction of currents flowing through the elongated resistances 14a – 14d, namely, the longitudinal directions, are the <111> axis directions which are axial directions the same system. That axis which orthogonally intersects the [$\bar{1}$1$\bar{1}$] axis direction in the longitudinal direction of the resistances 14a and 14c is the [$\bar{1}$1$\bar{2}$] axis direction and that axis direction which intersects orthogonally the [1̄1̄1] axis direction in the longitudinal direction of the resistances 14b and 14d is the [1̄1̄2] axis direction. Thus, the directions which are orthogonal to the directions of the currents, namely, the width directions of the elongated resistances are the <112> axis directions of the same crystal system.

The diffusion rate of impurities in a semiconductor substrate differs in dependence upon the crystal axis direction. In accordance with the present invention, the longitudinal direction and the width direction of each of the four elongated resistances 14a - 14d which form the bridge are axial directions of the same system. As a result, in so far as the use of the same diffusion mask is concerned, elongated resistances having the same configuration can be formed. The respective resistances 14a - 14d can be formed in proximity to one another as long as they conform with the crystal axis directions, so that dispersions in the impurity diffusion concentration are reduced and, as a result, four elongated resistances which possess the same resistance values can be obtained.

Since the dispersion of the impurity diffusion concentration among the resistances 14a - 14d is small, the dispersion of the temperature coefficient of the resistances is also small, which results in the advantage that the transducer is not affected by changes in ambient temperature.

Consequently, where the bridge is formed of elongated resistances 14a - 14d, a very precise output which is not influenced by changes in ambient temperature will result. For zero pressure input, the bridge is balanced and a zero output from the terminals of the bridge is obtained. In accordance with the present invention, it is especially desirable that the longitudinal directions of the resistances 14a - 14d be the <111> axis directions in which the piezo-resistance coefficient is a maximum, so that the pressure-electric output transduction sensitivity is high. Of course, if the pressure-electric output transduction sensitivity is permitted to be low, other crystal axial directions may be employed for the directions of the elongated resistances, in accordance with the present invention.

As is illustrated in FIG. 1, it is possible to provide four sets of elongated resistances surrounding the edge of the strainable region 13a of the silicon diaphragm. For each of the elongated resistance sets, the longitudinal directions are the <111> axis directions and the width direction of each resistance is in the <112> axial direction.

In accordance with the present invention, a semiconductor pressure transducer can be constructed in such a fashion that four elongated resistances are formed in each of four locations on the silicon diaphragm prior to the connection of electrical terminals, and among the four elongated resistance sets, the set which employs resistance elements having the least dispersion characteristics can be used to provide an accurate transducer output.

Figure 6:
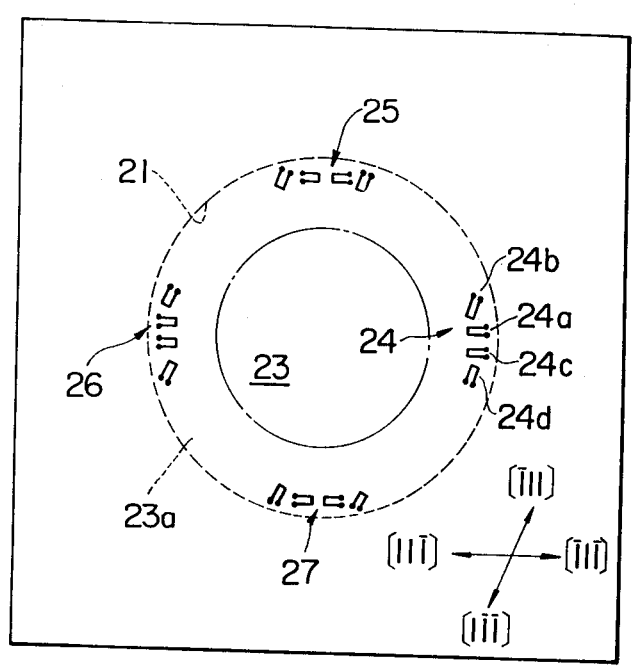
FIG. 6 is a plan view of a silicon diaphragm pressure transducer according to another embodiment of the present invention.

Another embodiment of the present invention is illustrated in FIG. 6 which shows a silicon diaphragm 20 having substantially the same construction as the diaphragm 10 shown in FIGS. 1 and 2. The difference between the embodiment in FIG. 6 and that in FIGS. 1 and 2 relates to the arrangement of the elongated resistances.

Referring now to FIG. 6, a square-shaped n-type silicon wafer having its upper surface in the (110) crystal plane is employed. A circular concave portion 21 is provided at the central portion of the wafer and elongated resistance sets 24 - 27 are disposed in the thin-walled portion 23. The resistance sets 24 - 27 are formed by diffusing a p-type impurity into the portion 23 surrounding and adjacent to the edge of the strainable thin-walled portion 23.

Looking now at resistance set 24, containing resistances 24a - 24d, two of the resistances 24a and 24c are U-shaped, the longitudinal direction of which is in the [1̄1̄1] axis direction. The other two elongated resistances 24b and 24b are disposed on oppoite sides of the resistances 24a and 24c, have U-shapes, and have a longitudinal direction in the [1̄1̄1] axis direction.

Figure 7:
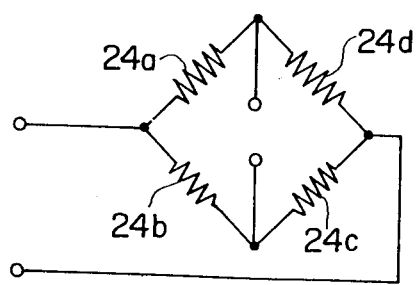
FIG. 7 is a schematic illustration of a bridge made up of elongated resistance elements formed in the silicon diaphragm of FIG. 6.

FIG. 7 illustrates the bridge configuration of resistances 24a - 24c, with resistances 24a and 24c along the [1̄1̄1] axial direction forming one set of opposing arms of the bridge, while resistances 24b and 24d, disposed along the [1̄1̄1] axis direction which does not orthogonally intersect the other [1̄1̄1] axis direction, become the other set of opposing arms of the bridge.

The current conducting directions of the resistances 24a - 24d are the <111> axis directions and the width directions of the U-shaped resistances are the <112> axis directions, and the axisl directions are the same Miller index systems. Moreover, the resistances are arranged in proximity to one another as shown in FIG. 6.

Because of this configuration and axial direction positioning, there is hardly any dispersion in the impurity diffusion and impurity diffusion rate of the p-type material forming the resistances, per se. As a result, the resistance values are substantially equal and there is no differential change in resistance value between the resistances for a change in ambient temperature.

SInce the elongated resistance 24b does not intersect orthogonally to any radial direction, the proportion of resistance changes to pressure is lower than in the elongated resistances 24a, 24c and 24d. As a result, the sensitivity of the embodiment of FIG. 6 is somewhat lower than the sensitivity of the embodiment of the transducer in FIGS. 1 and 2.

Still, for each embodiment of the invention, the elongated resistances which are combined into the bridge configuration have current conducting directions and width directions which are established in accordance with prescribed axis directions and the resistances are disposed in proximity to one another, so that their resistance values and impurity concentrations of the individual resistances are uniform. As a result, when the pressure input to the silicon diaphragm is zero, namely there is no pressure input, no imbalance of the bridge occurs and no electrical output is produced. Moreover, for changes in ambient temperature, the accuracy of the bridge configuration of the resistances is not effected.

While we have shown and described several embodiments in accordance with the present invention it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

We claim:

1. A semiconductor pressure transducer comprising:
   a monocrystalline semiconductor diaphragm, only the perimeter of which is fixed to a base so that a central portion of the diaphragm produces in a radial direction thereof a first strain with a polarity opposite to that of a second strain produced in a portion defined between the central portion and the perimeter, in response to a mechanical pressure applied to the diaphragm; and at least one set of semiconductor resistances of one conductivity type and comprising a first pair of resistances making up one pair of opposing arms of a resistance bridge and a second pair of resistances making up the other pair of opposing arms of said bridge;

wherein the first and second pairs of resistances extend along the same crystal axis system of the diaphragm, the extending direction of the first pair of resistances forming an angle other than 90° with that of the second pair of resistances; and wherein each semiconductor resistance formed in said diaphragm is formed only in said surface portion of said diaphragm defined between its central portion and its perimeter.

2. A semiconductor pressure transducer according to claim 1, wherein said surface portion of said semiconductor diaphragm lies in the {110} crystal plane, said resistances have p-conductivity type, and said one crystal axis system is the <111> system.

3. A semiconductor pressure transducer according to claim 1, wherein the longitudinal directions of said first pair of resistances extend along a crystal axis direction parallel to a radial direction of the diaphragm, and the longitudinal directions of said second pair of resistances extend along a crystal axis direction perpendicular to a radial direction of the diaphragm.

4. A semiconductor pressure transducer according to claim 1, wherein the longitudinal directions of said first pair of resistances extend along a crystal axis direction parallel to a radial direction of the diaphragm, and the longitudinal direction of at least one of said second pair of resistances extend along a crystal axis direction perpendicular to a radial direction of the diaphragm.

5. A semiconductor pressure transducer according to claim 1, wherein said at least one set of semiconductor resistances comprises four sets of four elongated resistances distributed about said edge of the strain producing region, and wherein the longitudinal directions of said first pair of resistances are the $[\bar{1}1\bar{1}]$ and $[11\bar{1}]$ directions, respectively, and wherein the longitudinal directions of said second pair of resistances are the $[1\bar{1}\bar{1}]$ and $[\bar{1}11]$ directions, respectively.

6. A semiconductor pressure transducer according to claim 5, wherein each of said semiconductor resistances is U-shaped, the pair of longer portions of which lie in a crystal axis direction belonging to the <111> system, and the interconnecting shorter portion of which lies in a crystal axis direction belonging to the <112> system.

* * * * *